(12) United States Patent
McKenna

(10) Patent No.: US 11,206,772 B2
(45) Date of Patent: Dec. 28, 2021

(54) GROW MEDIA SYSTEMS, APPARATUSES, AND METHODS

(71) Applicant: Shane McKenna, Holladay, UT (US)

(72) Inventor: Shane McKenna, Holladay, UT (US)

( * ) Notice: Subject to any disclaimer, the term of this patent is extended or adjusted under 35 U.S.C. 154(b) by 501 days.

(21) Appl. No.: 16/051,261

(22) Filed: Jul. 31, 2018

(65) Prior Publication Data

US 2019/0029192 A1 Jan. 31, 2019

Related U.S. Application Data

(60) Provisional application No. 62/539,376, filed on Jul. 31, 2017.

(51) Int. Cl.
| | | |
|---|---|---|
| *A01G 24/46* | (2018.01) | |
| *A01G 31/00* | (2018.01) | |
| *A01G 24/50* | (2018.01) | |
| *A01G 24/30* | (2018.01) | |
| *A01G 24/40* | (2018.01) | |

(52) U.S. Cl.
CPC ............ *A01G 24/46* (2018.02); *A01G 24/30* (2018.02); *A01G 24/40* (2018.02); *A01G 24/50* (2018.02); *A01G 31/00* (2013.01)

(58) Field of Classification Search
CPC ........ A01G 24/46; A01G 24/50; A01G 31/00; A01G 20/20
See application file for complete search history.

(56) References Cited

U.S. PATENT DOCUMENTS

| 4,972,627 A * | 11/1990 | Hori ................. A01G 5/06 47/64 |
| 5,226,255 A * | 7/1993 | Robertson ........... A01G 20/20 47/56 |
| 5,724,766 A * | 3/1998 | Behrens ............... E04D 11/002 47/56 |
| 6,219,965 B1 * | 4/2001 | Ishikawa ............. E01C 13/083 47/58.1 R |
| 2005/0217168 A1 * | 10/2005 | Fujita ............... A01G 20/20 47/9 |
| 2013/0133258 A1 * | 5/2013 | Carter ............... A01G 9/025 47/59 S |
| 2013/0340334 A1 | 12/2013 | Huang et al. |
| 2019/0104688 A1 * | 4/2019 | Abeles ............. A01G 24/44 |

FOREIGN PATENT DOCUMENTS

| RU | 2231250 C2 | 6/2004 |
| RU | 2237393 C | 10/2004 |
| WO | 2011137073 A1 | 11/2011 |

OTHER PUBLICATIONS

PCT/US2018/044704, "Notification of Transmittal of the International Search Report and the Written Opinion of the International Searching Authority, or the Declaration." International Searching Authority, dated Nov. 8, 2018, pp. 1-7.

* cited by examiner

*Primary Examiner* — Monica L Barlow
(74) *Attorney, Agent, or Firm* — Kunzler Bean & Adamson

(57) ABSTRACT

A grow media includes a layered grow media including a mechanical support structure layer and a wicking structure layer. The mechanical support structure layer and the wicking structure layer are coupled together in a vertical configuration.

14 Claims, 15 Drawing Sheets

GROW MEDIA SYSTEMS, APPARATUSES, AND METHODS

CROSS-REFERENCE TO RELATED APPLICATIONS

This application claims the benefit of U.S. Provisional Patent Application Ser. No. 62/539,376 filed on Jul. 31, 2017 for Shane McKenna, and entitled "GROW MEDIA FOR HYDROPONIC GROWING," the contents of which are hereby incorporated by reference herein.

FIELD

This invention relates to grow media and more particularly relates to a grow media in hydroponic environments, geoponic environments, etc.

BACKGROUND

Hydroponics is one method of growing plants without soil using mineral nutrient solutions in water. Various grow media have been utilized in conjunction with hydroponics but each have shortcomings, problems, and disadvantages. The subject matter of the present application has been developed in response to the present state of the art, and in particular, in response to the problems and disadvantages associated with conventional protective grow media that have not yet been fully solved by currently available techniques. Accordingly, the subject matter of the present application has been developed to provide embodiments of a system, an apparatus, and a method that overcome at least some of the shortcomings of prior art techniques. Additionally, the subject matter may be used in conjunction with soil or other organic materials.

SUMMARY

The subject matter of the present application has been developed in response to the present state of the art, and in particular, in response to the problems and disadvantages associated with conventional fixtures that have not yet been fully solved by currently available techniques. Accordingly, the subject matter of the present application has been developed to provide embodiments of a system, an apparatus, and a method that overcome at least some of the above-discussed shortcomings of prior art techniques.

Disclosed herein is a grow media. The grow media includes a layered grow media including a mechanical support structure layer and a wicking structure layer. The mechanical support structure layer and the wicking structure layer are coupled together in a vertical configuration. The preceding subject matter of this paragraph characterizes example 1 of the present disclosure.

The mechanical support structure layer and the wicking structure layer are coupled together in a spiral configuration and wherein the layered grow media is a spirally-layered grow media. The preceding subject matter of this paragraph characterizes example 2 of the present disclosure, wherein example 2 also includes the subject matter according to example 1, above.

The mechanical support structure layer is configured to mechanically support a root system for an organic plant. The preceding subject matter of this paragraph characterizes example 3 of the present disclosure, wherein example 3 also includes the subject matter according to any one of examples 1-2, above.

The wicking structure layer is configured to wick water and nutrients within the water or mixed in the water from a water basin to a root system for an organic plant. The preceding subject matter of this paragraph characterizes example 4 of the present disclosure, wherein example 4 also includes the subject matter according to any one of examples 1-3, above.

The mechanical support structure layer includes a lattice structure and a plurality of openings, wherein the plurality of openings are in an ordered array. The preceding subject matter of this paragraph characterizes example 5 of the present disclosure, wherein example 5 also includes the subject matter according to any one of examples 1-4, above.

The mechanical support structure layer includes a lattice structure and a plurality of openings, wherein the lattice structure is flexible but inelastic. The preceding subject matter of this paragraph characterizes example 6 of the present disclosure, wherein example 6 also includes the subject matter according to any one of examples 1-5, above.

The layered grow media includes a plurality of wicking layers and a plurality of variable layers. The preceding subject matter of this paragraph characterizes example 7 of the present disclosure, wherein example 7 also includes the subject matter according to any one of examples 1-6, above.

The wicking structure layer includes a mesh netting forming a plurality of apertures. The preceding subject matter of this paragraph characterizes example 8 of the present disclosure, wherein example 8 also includes the subject matter according to any one of examples 1-7, above.

The plurality of apertures vary in size and shape. The preceding subject matter of this paragraph characterizes example 9 of the present disclosure, wherein example 9 also includes the subject matter according to any one of examples 1-8, above.

The mesh netting is elastically stretchable to allow for the apertures to increase in size. The preceding subject matter of this paragraph characterizes example 10 of the present disclosure, wherein example 10 also includes the subject matter according to any one of examples 1-9, above.

The layered grow media further includes a variable layer including randomly oriented fibers. The preceding subject matter of this paragraph characterizes example 11 of the present disclosure, wherein example 11 also includes the subject matter according to any one of examples 1-10, above.

The layered grow media further includes a variable layer including a hydrophobic material. The preceding subject matter of this paragraph characterizes example 12 of the present disclosure, wherein example 12 also includes the subject matter according to any one of examples 1-11, above.

The layered grow media further includes a variable layer including a hydrophilic material. The preceding subject matter of this paragraph characterizes example 13 of the present disclosure, wherein example 13 also includes the subject matter according to any one of examples 1-12, above.

The layered grow media further includes a variable layer including one of random oriented strand batting, an open mesh pad, a chopped recycled fabric, a woven fabric, a knit fabric, or a loose pack variable layer. The preceding subject matter of this paragraph characterizes example 14 of the present disclosure, wherein example 14 also includes the subject matter according to any one of examples 1-13, above.

The layered grow media further includes a variable layer. The mechanical support structure layer, the wicking structure layer, and the variable layer are coupled together in a spiral configuration and wherein the layered grow media is a spirally-layered grow media. The mechanical support structure layer is configured to mechanically support a root system for an organic plant and the mechanical support structure layer includes a repeating lattice structure and a plurality of repeating openings. The wicking layer is configured to wick water and nutrients within the water or mixed in the water from a water basin to the root system for the organic plant and the wicking layer includes a mesh netting forming a plurality of apertures. The plurality of apertures vary in size and shape. The mesh netting is elastically stretchable to allow for the apertures to increase in size. The variable layer includes randomly oriented fibers. The spirally-layered grow media includes a plurality of wicking layers and a plurality of variable layers. The preceding subject matter of this paragraph characterizes example 15 of the present disclosure, wherein example 15 also includes the subject matter according to any one of examples 1-14, above.

Disclosed herein is a system. The system includes a layered grow media. The layered grow media includes a mechanical support structure layer and a wicking structure layer. The mechanical support structure layer and the wicking structure layer are coupled together in a vertical configuration. The wicking structure layer is configured to wick water and nutrients within the water or mixed in the water from a water basin to a root system for an organic plant. The wicking structure layer includes a mesh netting forming a plurality of apertures. The mesh netting is elastically stretchable to allow for the apertures to increase in size. The preceding subject matter of this paragraph characterizes example 16 of the present disclosure.

The system further includes soil or an aggregate medium and a water basin. The preceding subject matter of this paragraph characterizes example 17 of the present disclosure, wherein example 17 also includes the subject matter according to example 16, above.

A grow media is disclosed. The grow media includes a wicking structure. The wicking structure is configured to wick water and nutrients within the water or mixed in the water from a water basin to a root system for an organic plant. The wicking structure includes a mesh netting forming a plurality of apertures. The mesh netting is elastically stretchable to allow for the apertures to increase in size. The preceding subject matter of this paragraph characterizes example 18 of the present disclosure The grow media further includes a mechanical support structure layer, wherein the mechanical support structure layer and the wicking structure are coupled together in a vertical configuration. The preceding subject matter of this paragraph characterizes example 19 of the present disclosure, wherein example 19 also includes the subject matter according to example 18, above.

The grow media further includes a variable layer, and wherein the mechanical support structure layer, the wicking layer, and the variable layer are not mechanically coupled to each other. The preceding subject matter of this paragraph characterizes example 20 of the present disclosure, wherein example 20 also includes the subject matter according to any one of examples 18-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
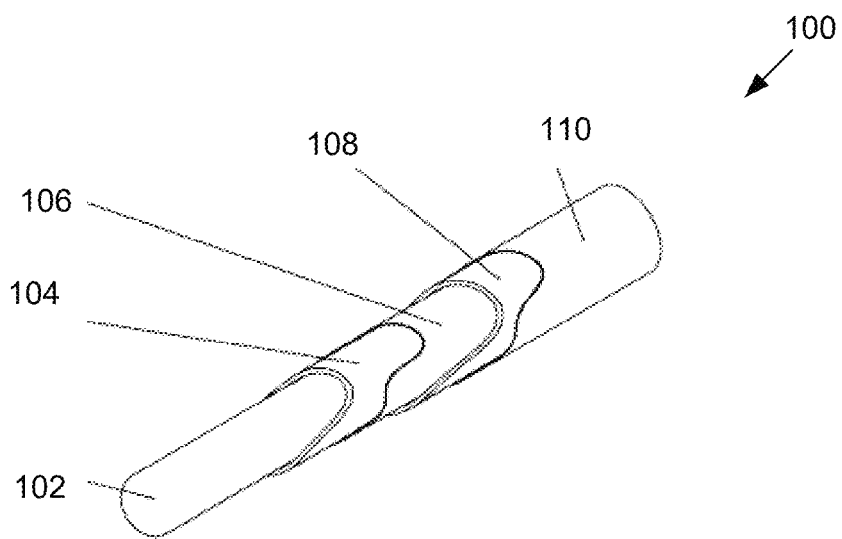
FIG. 1 is a perspective cutaway view of a grow media, according to one or more embodiments of the present disclosure.

Referring to FIG. 1, a perspective cutaway view of a grow medium 100 for use in hydroponic growing, geoponic growing, or mixtures thereof is shown. In the illustrated embodiment, the grow medium 100 includes a wicking sleeve 110 surrounding an elongated mechanical support structure 102. The grow medium 100 can be configured in various ways and with various layers which are illustrated in the embodiment depicted in FIG. 1. Although the grow medium 100 is shown and described with certain components and functionality, other embodiments of the grow medium 100 may include fewer or more components to implement less or more functionality. A variety of embodiments are depicted and described herein to illustrate potential variations and are not intended to be limiting.

In the illustrated embodiment, the grow medium 100 includes various layers that provide varying functionality which may or may not be present in other embodiments. The grow medium 100 includes an outer wicking sleeve 110 that surrounds the mechanical support structure 102. In between the wicking sleeve 110 and the mechanical support structure 102 are various layers which may be optional and can be selected based on the particular needs of the growing environment in which the grow medium 100 will be used. The grow medium 100 utilizes the wicking sleeve 110 (and potentially other layers) to wick water (and the nutrients within the water or mixed in the water) from a water basin to the plants.

A plurality of grow media 100 are placed in a grow bin or other growing apparatus. For example, the bottom of a grow bin can be lined with grow media 100 (similar to those depicted in FIGS. 1-14A). Seeds or seedlings can then be placed in the crevices or seams 115 between the grow media 100. The water and nutrients are delivered or present in the bottom of the grow bin and the grow media 100 wicks the water and nutrients (via the wicking sleeve 110 or other layers) up to the plant. Wicking materials have been used extensively in plant growing applications, however, some embodiments described herein allow for a shaped core and structure that can be tailored to provide proper compaction and shape for the wicking sleeve 110. Other embodiments may allow for variable side apertures in a mesh netting that supports and efficiently wicks water and nutrients to root systems. Some embodiments may include a filter at the bottom of the grow media 100 that filters and catches minerals or nutrients or soil if traditional water methods are used.

The illustrated embodiment includes an internal mechanical support structure 102. As will be illustrated by the many embodiments described herein the mechanical support structure can have many different shapes and configurations to provide a shape and space without significant cost or weight. The weight of the grow media 100 may be important in vertical farming systems or in conveyor farming systems as more weight requires more energy to be expended and increased infrastructure costs to support the weight.

The mechanical support structure 102, in the illustrated embodiment of FIG. 1, is a hollow molded cylinder. The hollow cylinder takes up space without adding significant weight. In addition, the hollow cylinder can be manufactured with less material and with less cost. The hollow cylinder may be blow molded, injection molded, thin-wall injection molded, extrusion molded, compression molded or other inexpensive repeatable process. In another embodiment, the hollow cylinder may be an extruded tube. The elongated structure of the mechanical support structure 102 may be accomplished in a variety of ways. In some embodiments, the mechanical support structure is a laminar layer or a spiral layer (see depiction and description of FIGS. 21-30.)

Figure 5:
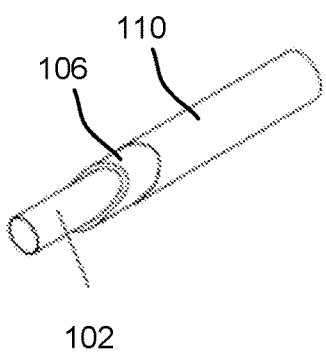
FIG. 5 is a perspective cutaway view of a grow media, according to one or more embodiments of the present disclosure.
Figures 9A, 10A:
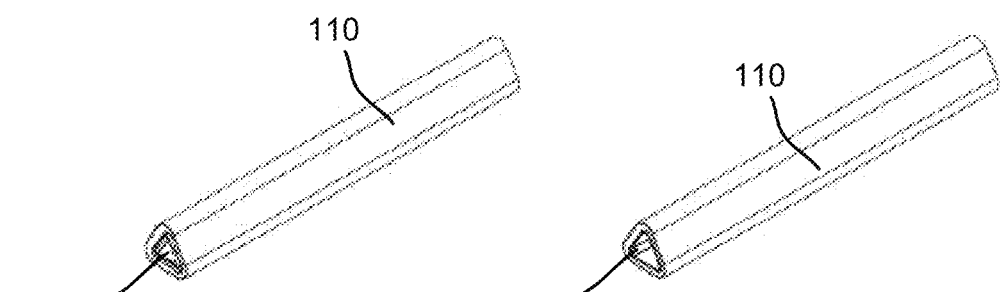
FIG. 9A is a perspective view of a grow media, according to one or more embodiments of the present disclosure.
FIG. 10A is a perspective view of a grow media, according to one or more embodiments of the present disclosure.
Figures 9B, 10B:
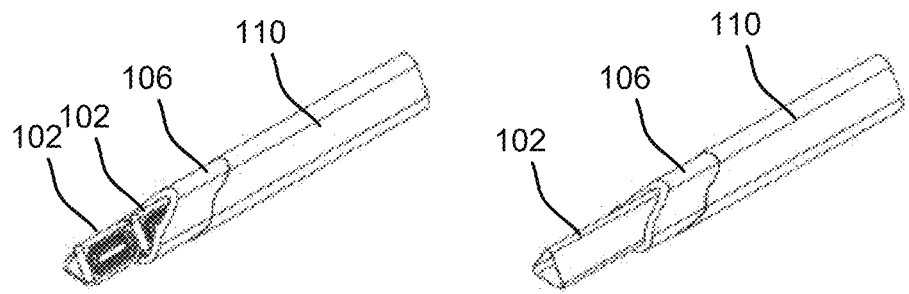
FIG. 9B is a perspective cutaway view of the grow media of depicted in FIG. 7A, according to one or more embodiments of the present disclosure.
FIG. 10B is a perspective cutaway view of the grow media of depicted in FIG. 7A, according to one or more embodiments of the present disclosure.

In some embodiments, the ends of the elongated structure may be closed as illustrated in FIG. 1 or the elongated structure of the mechanical support structure 102 may have open ends as illustrated, for example, in FIGS. 10A and 10B (which depict a triangular extruded mechanical support structure 102). FIG. 14B illustrates a substantially rectangular extruded shape with beveled corners as the mechanical support structure 102. FIG. 5 illustrates an extruded tube with open ends as the mechanical support structure 102.

Figure 2:
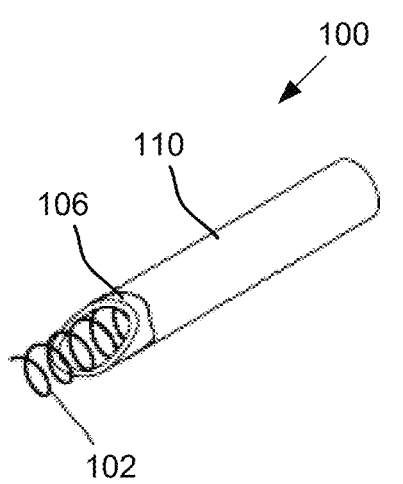
FIG. 2 is a perspective cutaway view of a grow media, according to one or more embodiments of the present disclosure.
Figure 7A:
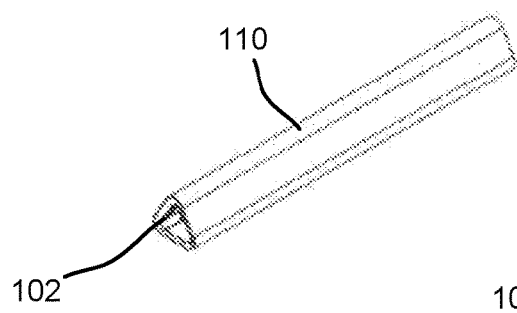
FIG. 7A is a perspective view of a grow media, according to one or more embodiments of the present disclosure.
Figure 7B:
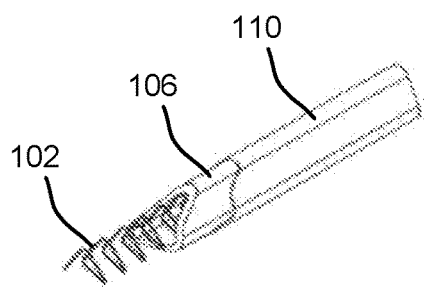
FIG. 7B is a perspective cutaway view of the grow media of depicted in FIG. 7A, according to one or more embodiments of the present disclosure.
Figure 11A:
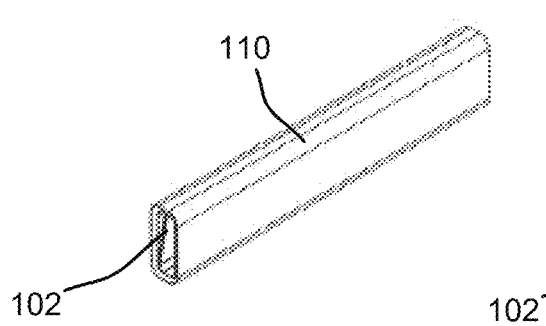
FIG. 11A is a perspective view of a grow media, according to one or more embodiments of the present disclosure.
Figure 11B:
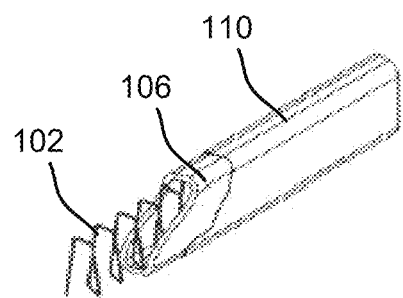
FIG. 11B is a perspective cutaway view of the grow media of depicted in FIG. 7A, according to one or more embodiments of the present disclosure.

In some embodiments, the mechanical support structure 102 is coiled plastic (see, for example, FIGS. 2, 7B, and 11B). The coiled plastic provides a shaped structure inexpensively and with minimal material costs, minimal weight (as the space between the coil is free), and easy repeatability for manufacturing. In FIG. 2, the plastic is formed in a circular helix configuration to provide the same shape as the hollow molded cylinder of FIG. 1 but with a different manufacturing process and varying level of material used. A mechanical support structure 102 of coiled plastic can further be used to provide various shapes, the circular helix as depicted in FIG. 2, the triangular helix as depicted in FIG. 7B, the rectangular helix as depicted in FIG. 11B. As may be understood by those skilled in the art, many different shapes may be utilized including, but not limited to, an oval helix, a hexagonal helix, an octagonal helix, etc.

Figure 3:
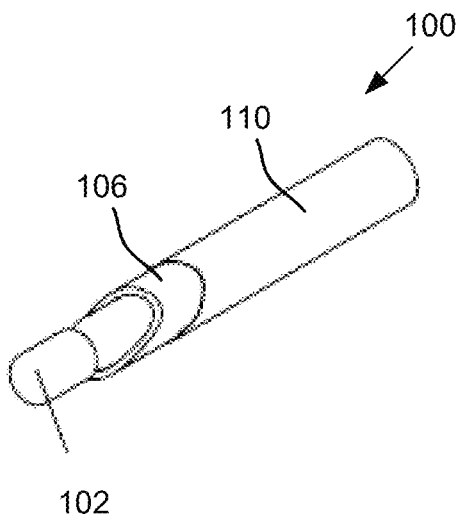
FIG. 3 is a perspective cutaway view of a grow media, according to one or more embodiments of the present disclosure.
Figure 4:
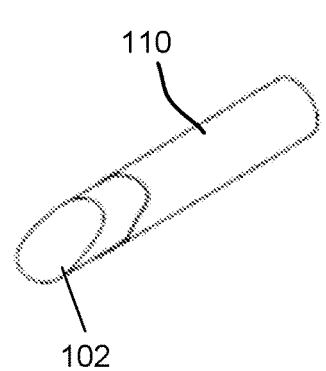
FIG. 4 is a perspective cutaway view of a grow media, according to one or more embodiments of the present disclosure.

In some embodiments, the mechanical support structure 102 is not a unitary structure but a plurality of repeating unitary structures or pods. This is illustrated plainly by FIGS. 3, 9B, and 13B. Referring to FIG. 3, instead of one elongated hollow cylinder, a plurality of hollow cylinders or pods are lined up end to end and function as the mechanical support structure 102. While the embodiment of FIG. 3 provides substantially the same shape as that depicted by one elongated hollow cylinder (see, for example, FIG. 1), by utilizing a plurality of hollow cylinders allows for the easy manufacture of smaller hollow cylinders which can be grouped in differing numbers and sized differently depending on the number of smaller hollow cylinders that are used.

Utilizing smaller structures as the mechanical support structure 102 may allow for repeatable manufacturing and lower material costs. In addition, the crevices between the repeatable structures may further provide a varying compaction which may stimulate growth of the plants as the roots may seek the lower compaction provided at the crevices. Referring to FIG. 9B, repeatable triangular prisms are used as the mechanical support structure 102. The triangular prisms provide substantially the same shape as the hollow triangular prism mechanical support structure 102 depicted in FIG. 8B and the triangular extrusion mechanical support structure 102 depicted in FIG. 10B. The repeatable structures of FIG. 9B further have holes to decrease the material needed and to further provide decreased compaction at those points.

Figure 13A:
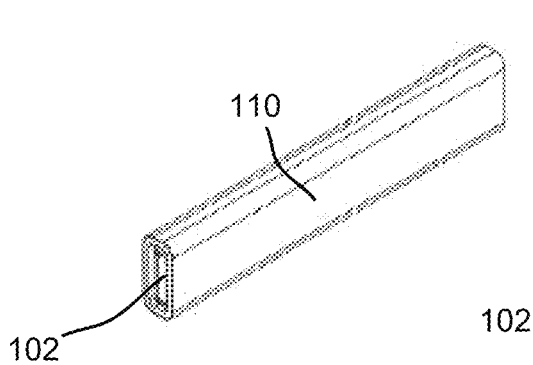
FIG. 13A is a perspective view of a grow media, according to one or more embodiments of the present disclosure.
Figure 13B:
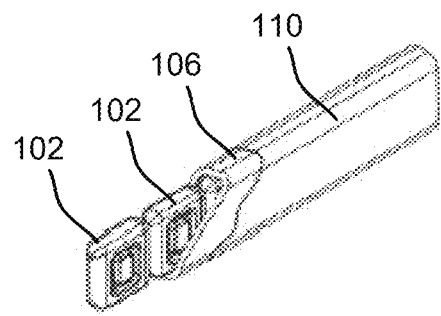
FIG. 13B is a perspective cutaway view of the grow media of depicted in FIG. 7A, according to one or more embodiments of the present disclosure.

Referring to FIG. 13B, the smaller repeatable structures are rectangular cuboids. Lined end to end the rectangular cuboids provide substantially the same shape as the rectangular extrusion depicted in FIG. 14B and the coiled plastic mechanical support structure 102 depicted in FIG. 11B. The rectangular cuboids further have holes through the center of the rectangular cuboids to decrease the material needed and to further provide decreased compaction at those points.

The pods may be sealed or not sealed. The pods may include further structural components. In some embodiments, the mechanical support structure 102 includes various holes, perforations, ribs, pockets, trenches, ruts, conduits and other similar structures to provide space for air to reach the water and aerate and oxygenate the water (see, for example, FIG. 12B). The mechanical support structure 102 of 12B includes holes along the rectangular prism. The holed provide space for air to reach the water in a grow bin and provide needed aeration or oxygenation without a separate system. The aeration occurs at the grow bin and by doing so, can greatly decrease overall system costs as the need of separate aeration systems can be eliminated. While depicted as holes along the rectangular prism of FIG. 12B, different structural components may provide access for aeration. For example, ribs may run the length of the prism or in another direction such as transverse to the length. The ribs would provide a pocket of air space between them to serve as a conduit for the air. Other such structural components may be envisioned by those skilled in the art. The structural components, while described in conjunction with the pods, may be applied to the other configurations of the mechanical support structure described herein.

The functionality of the structural components may further be inherent within the other configurations of mechanical support structures 102. For example, the coiled plastic configuration provides a substantial amount of air space (to provide aeration) in a similar fashion as described in conjunction with the structural components described above.

Figure 20:
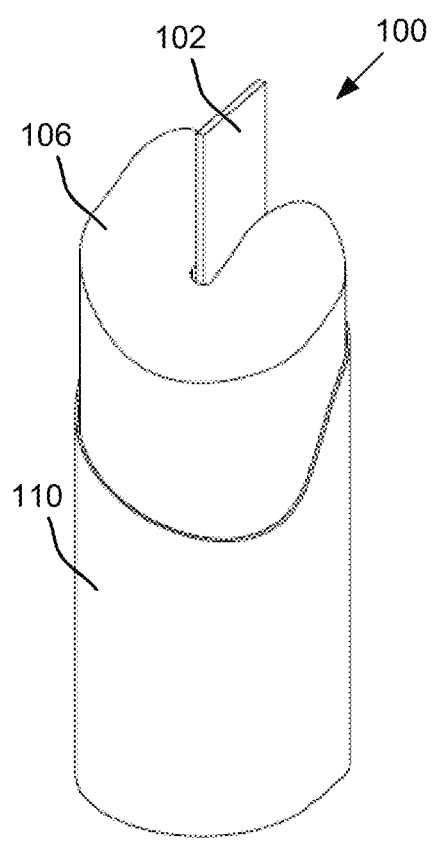
FIG. 20 is a perspective view of a grow media, according to one or more embodiments of the present disclosure.

The mechanical support structures 102 described herein provide spacing which can be controlled by the shape of mechanical support structure 102 selected. As shown and depicted herein, four principal shapes are shown, a circular shape (see FIGS. 1-3, 5-6, an oval shape (see FIG. 4), a triangular shape (see FIGS. 7A-10B), and a rectangular shape (see FIGS. 11A-14B). However, embodiments of the invention are not limited to these shapes as any prismatic shape may be utilized without departing from the understanding of description herein. In addition, other variations are contemplated including as depicted in FIG. 20, which shows a cutaway view of a vertical orientation with a vertical rib as the mechanical support structure 102, with U-shaped variable layer 106 and a wicking sleeve 110.

In addition, the orientation of the grow media 100 may allow for the control of height of the wicking sleeve 110 to the plants. For illustrative purposes only, an example involving FIGS. 11A-14B is provided. The grow media 100 of FIGS. 11A-14B may be oriented in various ways which may increase or decrease the height of the wicking sleeve 110. In a first orientation, the grow media 100 may line the bottom of a grow bin with shorter edges horizontal and the longer edges vertical. Such a configuration would provide a decreased distance or spacing of the crevices between the grow media 100 but would provide a larger distance between the water at the bottom of the grow bin and the roots of the plants. That is, the water and nutrients wicked up the wicking sleeve 110 would have to travel a longer distance to reach the roots. Plants that require less spacing and less water would flourish in such a configuration.

If the orientation of the grow media 100 were changed such that the shorter edges were vertical and the longer edges were horizontal, the effects would change. In such a configuration, the distance or spacing of the crevices between the grow media 100 would be larger but the distance between the water at the bottom of the grow bin and the roots of the plants would be smaller. The smaller distance would result in more wicking to occur. Plants that require more spacing and more water would flourish in such a configuration.

Depending on the particular needs of the plants being grown in the grow bin, the same shaped grow media 100 may be used in two distinct orientations (described in the previous two paragraphs) to provide different results.

Some embodiments of the grow media 100 include an inflatable mechanical support structure 102 (see, for example FIG. 6) or an air bladder which can be blown up to specification to provide the proper amount of compaction between the grow media 100. That is, inflating an air bladder will increase the compaction between the grow media 100 and deflating the air bladder will decrease the compaction between the grow media 100. Different plants grow better or worse depending on the compaction to which their roots are subjected. An air bladder within the grow media 100 allows for the grow media 100 to be tailored to the needs of the particular plant being grown. The air bladder may be, for example, the hollow cylinder of the mechanical support structure 102 such as is depicted in FIG. 1. The hollow cylinder may be pressurized or blown up to provide a level of compaction or likewise depressurized to provide a lower level of compaction. The inflatable mechanical support structure 102 can be utilized in conjunction with the other configurations of mechanical support structures 102 described herein.

Some embodiments include a variable layer 106 between the wicking sleeve 110 and the mechanical support structure 102. The variable layer 106 may be provide varying functionality depending the need of the grow media 100. In some embodiments, the variable layer 106 is a random oriented strand batting. In some embodiments, the variable layer 106 is an open mesh pad. In some embodiments, the variable layer 106 is chopped recycled fabric. In some embodiments, the variable layer 106 is a woven fabric. In some embodiments, the variable layer 106 is a knit fabric. The variable layer 106 is, in some embodiments, a loose pack variable layer that separates the wicking sleeve 110 from the mechanical support structure 102.

As the mechanical support structure 102 provides structure and consistent spacing, the variable layer 106 is a transition to the wicking sleeve 110 which wicks the water. In other examples of grow media, a wicking layer merely surrounds batting of one kind or another. The batting does not provide shape to the wicking layer and compaction can only be adjusted by increasing or decreasing the batting within the wicking layer. By contrast, the mechanical support structure 102 of embodiments described herein may reduce the amount of batting needed as, the batting may only be needed in the variable layer 106. More air space is created and further the shape of the grow medium 100 can be consistent. The batting may, in some examples, be polyester, a food grade polyester, or a polyethylene, etc.

Referring back to FIG. 1, various layers are depicted which allows for various embodiments to be employed together as the layers between the mechanical support structure 102 and the wicking sleeve 110 can provide very distinct functions. In one example, the combination of various hydrophilic and/or hydrophobic layers can be combined to provide a particular function to a particular type of plant. FIG. 1 includes a mechanical support structure 102. The internal core, may take varying shapes, sizes, and configurations which have been described herein in detail and is not repeated for the sake of brevity. Surrounding the mechanical support structure 102 is a first variable layer 104. The first variable layer may be hydrophilic felt, hydrophilic batting, hydrophobic felt, hydrophobic batting, an open mesh pad, chopped recycled fabric, hydrophilic woven fabric, hydrophilic knit fabric, hydrophobic woven fabric, or hydrophilic knit fabric, etc. The second variable layer 106 in FIG. 1 may employ one of the above examples but different from the first variable layer 104. By combining two different variable layers, the grow media 100 can be tailored to various specifications. The grow media 100 further includes a first wicking sleeve 108 and a second wicking sleeve 110. The first wicking sleeve 108 may be a hydrophilic felt, hydrophilic batting, random oriented strands, or chopped recycled fabric, etc. The second wicking sleeve 110 may be a hydrophilic woven fabric or a hydrophilic knit fabric. As can be understood by the various configurations described in conjunction with FIG. 1, a grow medium 100 may take varying configurations and provide varying functionality depending on the needs of the plant being grown. These configurations are not meant to be limiting and are not expanded upon solely for the sake of brevity.

Methods of manufacturing and/or assembling the grow media as described herein are also claimed which methods may include inserting mechanical support structures 102 and variable layers within a wicking sleeve 110. In addition, growing systems which employ the grow media 100 described herein are further contemplated and claimed herein. As an example, referring to FIGS. 15 and 16, a system 150 including a grow bin 125 with a plurality of grow media 100 lining the bottom of the grow bin is contemplated and claimed herein. In one example, a rectangular grow bin may include a plurality of grow media 100 lining the grow bin 125 side by side. That is, each grow media 100 will extend from a first side of the grow bin 125 to a second side opposite the first side. The plurality of grow media 100 will be positioned next to each other and extend from a third side, perpendicular to the first and second sides, to a fourth side, also perpendicular to the first and second sides. Between any two grow media 100 is a seam 115 into which the seeds or seedlings can be positioned.

Figure 6:
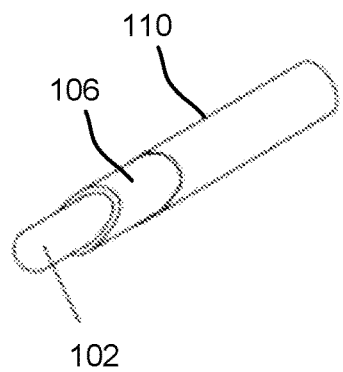
FIG. 6 is a perspective cutaway view of a grow media, according to one or more embodiments of the present disclosure.

While depicted as a rectangular basin, the grow bin 125 may include various other shapes including, but not limited to, circular, oval, irregular, asymmetrical, etc. In such examples, the grow media 100 may each be of a different length and/or a different shape. In some embodiments, the grow media 100 may be, instead of substantially prism shapes, shaped along irregular lengths. The grow media 100 may be flexible to conform to circular or irregularly shaped grow bins. In order for the grow media 100 to be flexible along the length of the grow media 100, the internal cores are more likely to be pods (as illustrated in FIGS. 3, 9B, and 13B), or an inflatable core (as illustrated in FIG. 6), or made of a flexible material. Such embodiments allow the grow media 100 to be bent, twisted, contorted, or deformed, etc., to fit into an irregular grow bin.

Referring now to the wicking sleeve 110. The wicking sleeve 110 surrounds the mechanical support structure 102 and any potential variable layers 106. The wicking sleeve 110 may be, for example, a flexible woven or knit hydrophilic material. Materials that provide superior wicking are typically not rigid. Wicking materials are typically flexible and will not necessarily hold a shape. By providing an internal core 102 solid structure over which the wicking sleeve 110 may surround allows for a repeatable grow media 100 (in size, shape, and configuration) that can provide consistent specifications for growing plants. The wicking sleeve 110 may be slid like a sock over the mechanical support structure 102 and any further variable layers.

In some embodiments, the wicking sleeve 110 completely surrounds the mechanical support structure 102. In some embodiments, the wicking sleeve 110 merely surrounds the length of the mechanical support structure 102 and is open at the ends. In some embodiments, the wicking sleeve 110 is a flexible tubular fabric with a conduit from a first opening to a second opening. The wicking sleeve 110 merely fits over the mechanical support structure 102 and surrounds the mechanical support structure 102 along the length of the elongate structure of the mechanical support structure 102.

Referring now to FIGS. 7A and 7B, the grow medium 100 is depicted first in totality (FIG. 7A) and second in a cutaway view (FIG. 7B) to better illustrate the mechanical support structure 102 and variable layer 106. In FIG. 7A, it is shown that the wicking sleeve 110 surrounds the length of the mechanical support structure 102. Not visible (in FIG. 7A) is the variable layer 106 which is disposed between the mechanical support structure 102 and the wicking sleeve 110. In the illustrated embodiment, the mechanical support structure 102 is a plastic coiled helix which runs the length of the grow medium 102. The plastic coiled helix follows a substantially triangular shape. The triangular shape of the plastic coiled helix provides a shape for the variable layer 106 and the wicking sleeve 110. The wicking sleeve 110 is a flexible tubular shape with a first opening and a second opening which expose the mechanical support structure 102 and the variable layer 106 at each end of the elongated structure. As is depicted, the wicking sleeve 110 follows the shape of the mechanical support structure 102.

Figure 8A:
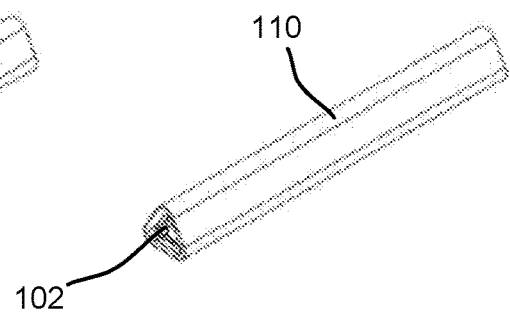
FIG. 8A is a perspective view of a grow media, according to one or more embodiments of the present disclosure.
Figure 8B:
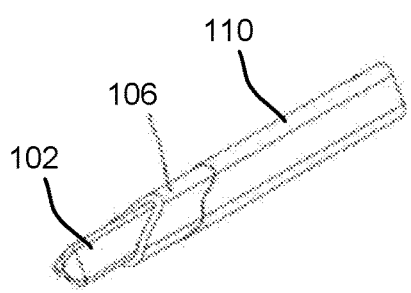
FIG. 8B is a perspective cutaway view of the grow media of depicted in FIG. 7A, according to one or more embodiments of the present disclosure.

Referring now to FIGS. 8A and 8B, the grow medium 100 is depicted first in totality (FIG. 8A) and second in a cutaway view (FIG. 8B) to better illustrate the mechanical support structure 102 and variable layer 106. In FIG. 8A, it is shown that the wicking sleeve 110 surrounds the length of the mechanical support structure 102. Not visible (in FIG. 8A) is the variable layer 106 which is disposed between the mechanical support structure 102 and the wicking sleeve 110. In the illustrated embodiment, the mechanical support structure 102 is a hollow prismatic structure which runs the length of the grow medium 102. The prismatic structure follows a substantially triangular shape. The triangular shape of the prismatic structure provides a shape for the variable layer 106 and the wicking sleeve 110. The wicking sleeve 110 is a flexible tubular shape with a first opening and a second opening which expose the mechanical support structure 102 and the variable layer 106 at each end of the elongated structure. As is depicted, the wicking sleeve 110 follows the shape of the mechanical support structure 102.

Referring now to FIGS. 9A and 9B, the grow medium 100 is depicted first in totality (FIG. 9A) and second in a cutaway view (FIG. 9B) to better illustrate the mechanical support structure 102 and variable layer 106. In FIG. 9A, it is shown that the wicking sleeve 110 surrounds the length of the mechanical support structure 102. Not visible (in FIG. 9A) is the variable layer 106 which is disposed between the mechanical support structure 102 and the wicking sleeve 110. In the illustrated embodiment, the mechanical support structure 102 is a plurality of pods placed end to end which runs the length of the grow medium 102. The plurality of pods follows a substantially triangular shape. The triangular shape of the plurality of pods provides a shape for the variable layer 106 and the wicking sleeve 110. The wicking sleeve 110 is a flexible tubular shape with a first opening and a second opening which expose the mechanical support structure 102 and the variable layer 106 at each end of the elongated structure. As is depicted, the wicking sleeve 110 follows the shape of the mechanical support structure 102.

Referring now to FIGS. 10A and 10B, the grow medium 100 is depicted first in totality (FIG. 10A) and second in a cutaway view (FIG. 10B) to better illustrate the mechanical support structure 102 and variable layer 106. In FIG. 10A, it is shown that the wicking sleeve 110 surrounds the length of the mechanical support structure 102. Not visible (in FIG. 10A) is the variable layer 106 which is disposed between the mechanical support structure 102 and the wicking sleeve 110. In the illustrated embodiment, the mechanical support structure 102 is extruded plastic which runs the length of the grow medium 102. The extruded plastic follows a substantially triangular shape. The triangular shape of the extruded plastic provides a shape for the variable layer 106 and the wicking sleeve 110. The wicking sleeve 110 is a flexible tubular shape with a first opening and a second opening which expose the mechanical support structure 102 and the variable layer 106 at each end of the elongated structure. As is depicted, the wicking sleeve 110 follows the shape of the mechanical support structure 102.

Referring now to FIGS. 11A and 11B, the grow medium 100 is depicted first in totality (FIG. 11A) and second in a cutaway view (FIG. 11B) to better illustrate the mechanical support structure 102 and variable layer 106. In FIG. 11A, it is shown that the wicking sleeve 110 surrounds the length of the mechanical support structure 102. Not visible (in FIG. 11A) is the variable layer 106 which is disposed between the mechanical support structure 102 and the wicking sleeve 110. In the illustrated embodiment, the mechanical support structure 102 is a plastic coiled helix which runs the length of the grow medium 102. The plastic coiled helix follows a substantially rectangular shape. The rectangular shape of the plastic coiled helix provides a shape for the variable layer 106 and the wicking sleeve 110. The wicking sleeve 110 is a flexible tubular shape with a first opening and a second opening which expose the mechanical support structure 102 and the variable layer 106 at each end of the elongated structure. As is depicted, the wicking sleeve 110 follows the shape of the mechanical support structure 102.

Figure 12A:
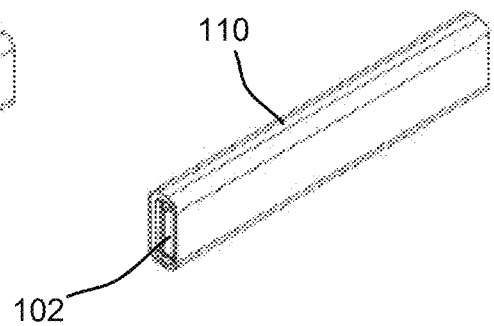
FIG. 12A is a perspective view of a grow media, according to one or more embodiments of the present disclosure.
Figure 12B:
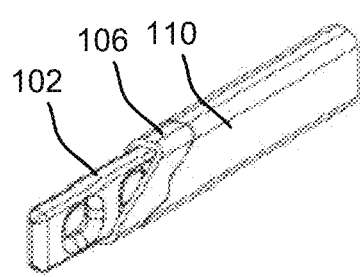
FIG. 12B is a perspective cutaway view of the grow media of depicted in FIG. 7A, according to one or more embodiments of the present disclosure.

Referring now to FIGS. 12A and 12B, the grow medium 100 is depicted first in totality (FIG. 12A) and second in a cutaway view (FIG. 12B) to better illustrate the mechanical support structure 102 and variable layer 106. In FIG. 12A, it is shown that the wicking sleeve 110 surrounds the length of the mechanical support structure 102. Not visible (in FIG. 12A) is the variable layer 106 which is disposed between the mechanical support structure 102 and the wicking sleeve 110. In the illustrated embodiment, the mechanical support structure 102 is a hollow prismatic structure which runs the length of the grow medium 102. The prismatic structure follows a substantially rectangular shape. The rectangular shape of the prismatic structure provides a shape for the variable layer 106 and the wicking sleeve 110. The wicking sleeve 110 is a flexible tubular shape with a first opening and a second opening which expose the mechanical support structure 102 and the variable layer 106 at each end of the elongated structure. As is depicted, the wicking sleeve 110 follows the shape of the mechanical support structure 102.

Referring now to FIGS. 13A and 13B, the grow medium 100 is depicted first in totality (FIG. 13A) and second in a cutaway view (FIG. 13B) to better illustrate the mechanical support structure 102 and variable layer 106. In FIG. 13A, it is shown that the wicking sleeve 110 surrounds the length of the mechanical support structure 102. Not visible (in FIG. 13A) is the variable layer 106 which is disposed between the mechanical support structure 102 and the wicking sleeve 110. In the illustrated embodiment, the mechanical support structure 102 is a plurality of pods placed end to end which runs the length of the grow medium 102. The plurality of pods follows a substantially rectangular shape. The rectangular shape of the plurality of pods provides a shape for the variable layer 106 and the wicking sleeve 110. The wicking sleeve 110 is a flexible tubular shape with a first opening and a second opening which expose the mechanical support structure 102 and the variable layer 106 at each end of the elongated structure. As is depicted, the wicking sleeve 110 follows the shape of the mechanical support structure 102.

Figure 14A:
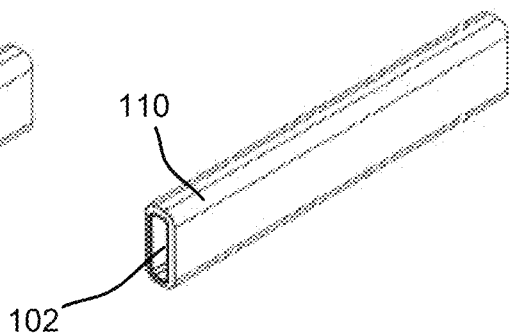
FIG. 14A is a perspective view of a grow media, according to one or more embodiments of the present disclosure.
Figure 14B:
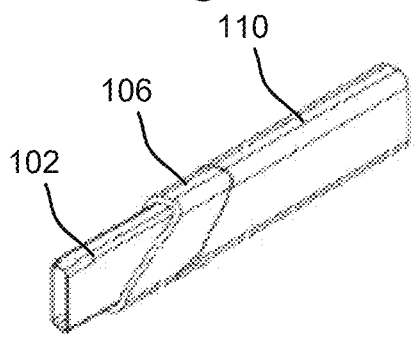
FIG. 14B is a perspective cutaway view of the grow media of depicted in FIG. 7A, according to one or more embodiments of the present disclosure.

Referring now to FIGS. 14A and 14B, the grow medium 100 is depicted first in totality (FIG. 14A) and second in a cutaway view (FIG. 14B) to better illustrate the mechanical support structure 102 and variable layer 106. In FIG. 14A, it is shown that the wicking sleeve 110 surrounds the length of the mechanical support structure 102. Not visible (in FIG. 14A) is the variable layer 106 which is disposed between the mechanical support structure 102 and the wicking sleeve 110. In the illustrated embodiment, the mechanical support structure 102 is extruded plastic which runs the length of the grow medium 102. The extruded plastic follows a substantially rectangular shape. The rectangular shape of the extruded plastic provides a shape for the variable layer 106 and the wicking sleeve 110. The wicking sleeve 110 is a flexible tubular shape with a first opening and a second opening which expose the mechanical support structure 102 and the variable layer 106 at each end of the elongated structure. As is depicted, the wicking sleeve 110 follows the shape of the mechanical support structure 102.

Figure 15:
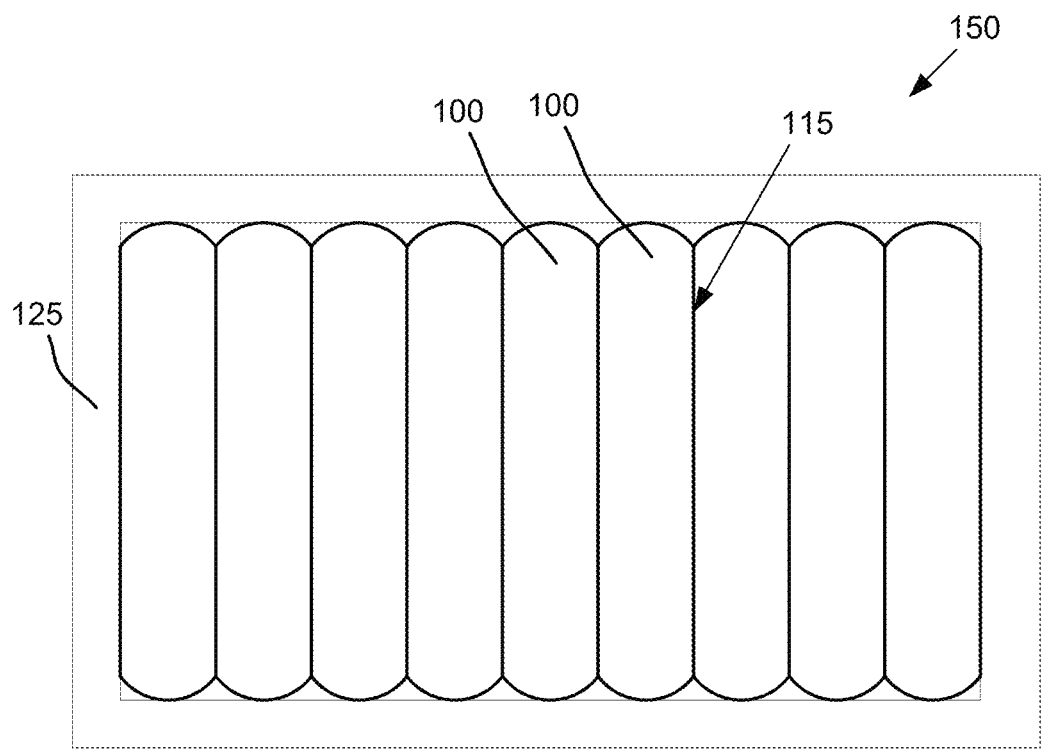
FIG. 15 is a top view of a system including a grow bin and grow media, according to one or more embodiments of the present disclosure.
Figure 16:
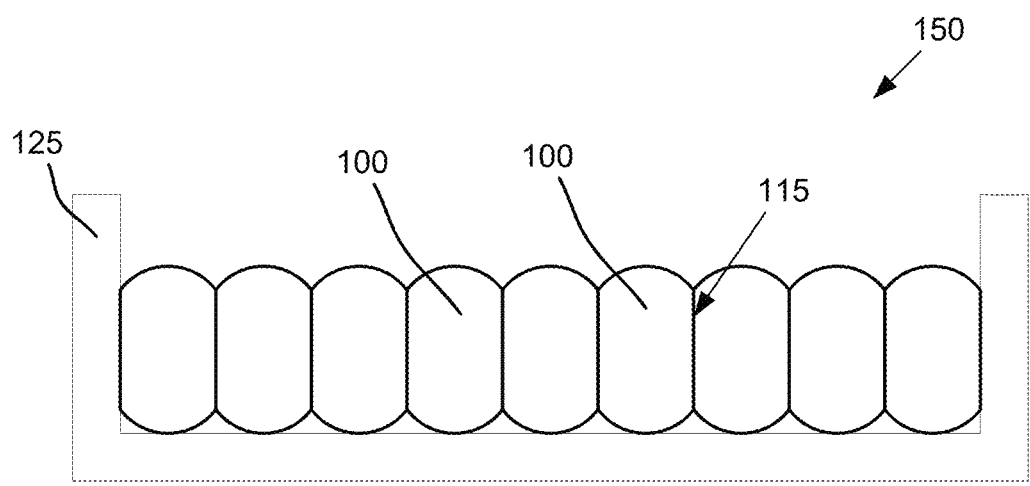
FIG. 16 is a side cutaway view of a system including a grow bin and grow media, according to one or more embodiments of the present disclosure.

Referring now to FIG. 15, a top view of a system 150 including a grow bin 125 with a plurality of grow media 100 lining the grow bin 125 is shown. Referring to FIG. 16, a side cross-sectional view of the system 150 is shown. The grow media 100 are oblong ovals pressed against each other.

Figure 17:
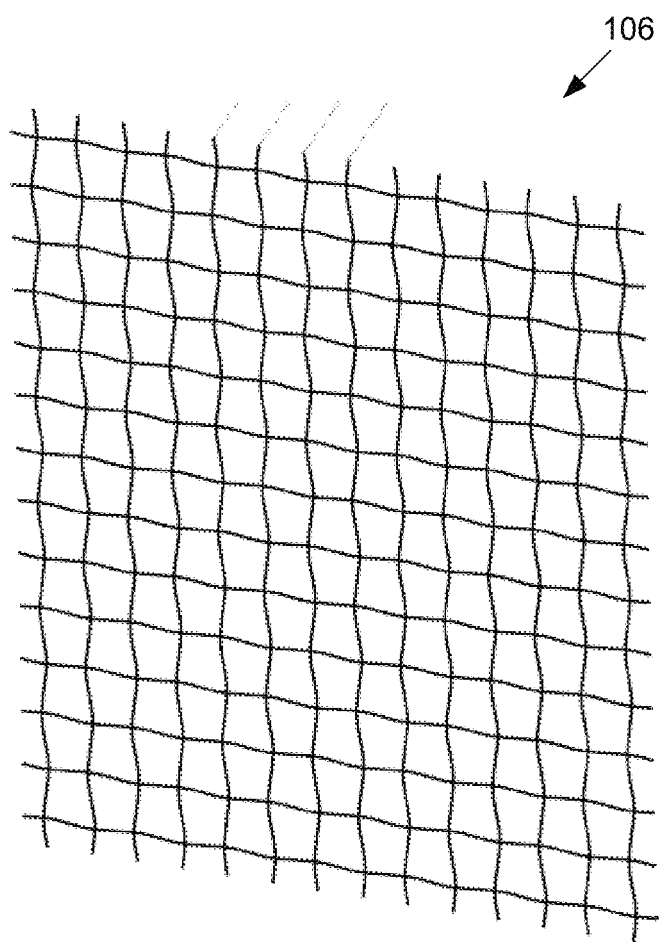
FIG. 17 is a perspective view of a variable layer, according to one or more embodiments of the present disclosure.

Referring now to FIG. 17, an embodiment of a variable layer 106 is shown prior to wrapping around an mechanical support structure 102. Although described and depicted as the variable layer 106, the structures, configurations, and materials may also be used in the wicking sleeve 110. The variable layer 106 includes a weave of individual threads. The threads may be hydrophobic or hydrophilic and may be woven in a repeatable pattern. In one example, the vertical threads may be hydrophilic and the horizontal threads hydrophobic. In another example, the vertical threads may be a repeating pattern of hydrophobic and hydrophilic threads (for example, every other thread is hydrophilic). By making a weave with more or less hydrophilic threads, the wicking potential of the grow media can be controlled. In addition, as the weave includes threads perpendicular to each other, the direction of wicking can be controlled as well. For example, wicking along the length of a grow media may not be ideal as a user wants the wicking action to occur up grow media. By wrapping the variable layer 106 around an mechanical support structure 102 so that the horizontal threads run lengthwise along the mechanical support structure 102 and the vertical threads wrap around the circumference of the mechanical support structure 102, the direction of wicking can be controlled. While not all possible patterns are explicitly described, such embodiments are claimed herein.

In addition, although shown as singular threads in FIG. 17, multiple combination threads may be intertwined. In addition, the threads may be different gauges or thickness depending on the need for a particular application. The ratios of thickness, gauges, combinations of threads may all be optimized to the needs or a particular application.

Figure 18:
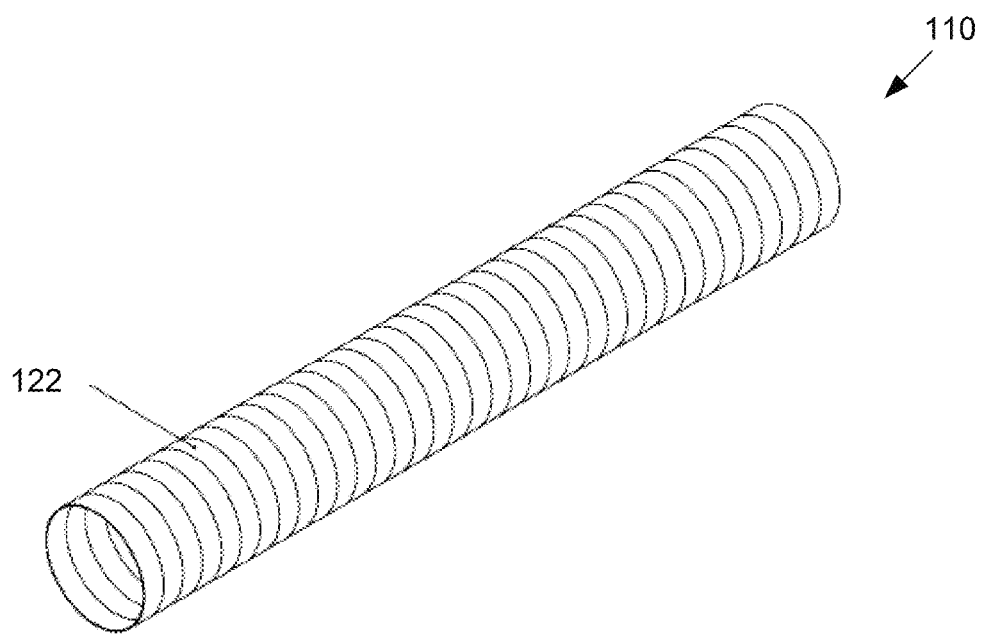
FIG. 18 is a perspective view of a wicking sleeve, according to one or more embodiments of the present disclosure.

Referring now to FIG. 18, a wicking sleeve 110 is shown. Although described and depicted as the wicking sleeve 110, the structures, configurations, and materials may also be used in the variable layer 106. The wicking sleeve 110 includes bands 122 which, in the example shown, would encircle the mechanical support structure 102 and variable layer 106 in a grow media. The bands 122 may be of different materials. For example, the bands 122 may alternate between hydrophobic and hydrophilic materials. The bands 122 may be sewn together another different repeatable pattern depending on the need for a particular application. The bands 122 are depicted as having the same width throughout the length of the wicking sleeve 110. However, in other embodiments, the bands 122 may have differing widths. For example, when the bands 122 are alternating between hydrophobic and hydrophilic materials, the hydrophilic bands may be wider than the hydrophobic bands. In another example, the hydrophilic band may be narrower than the hydrophobic bands. In another example, the bands 122 are actually a tightly woven weave like what is described in conjunction with FIG. 17.

Figure 19:
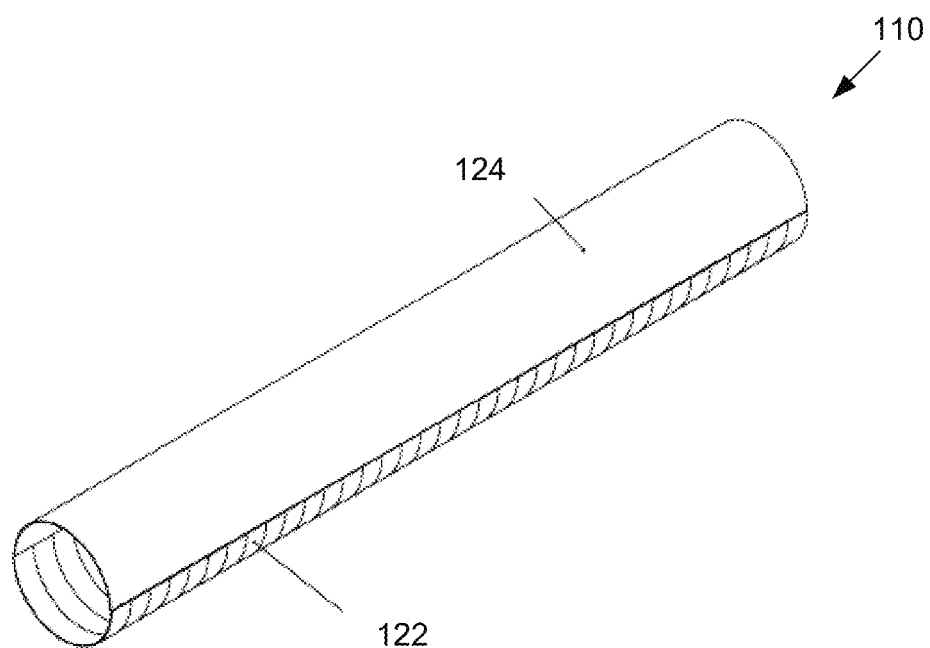
FIG. 19 is a perspective view of a wicking sleeve, according to one or more embodiments of the present disclosure.

Referring now to FIG. 19, a wicking sleeve 110 is shown. Although described and depicted as the wicking sleeve 110, the structures, configurations, and materials may also be used in the variable layer 106. The wicking sleeve 110 includes bands 122 which, in the example shown, would only cover half of the circumference of the mechanical support structure 102 and variable layer 106. In other embodiments, the bands 122 may cover only a portion of the mechanical support structure 102. For example, more or less than half of the circumference. The bands 122 could be configured (e.g. alternating or repeating pattern) similar to what is described above in conjunction with FIG. 18. The wicking sleeve 110 includes a panel 124 sewn to the bands 122. When the grow media 100 is placed in a grow bin with the panel 124 facing up and the bands 122 facing down, the panel 124 may work to reduce, restrict, or prohibit evaporation. As the panel 124 is the exposed portion of the grow media 100, the panel 124 could reduce potential evaporative loss.

Many of the embodiments contemplated herein include systems with a plurality of grow media 100 each with an individual mechanical support structure 102, variable layer 106, and wicking sleeve 110. In another embodiment, a system would include a single wicking sleeve 110 which is designed to encapsulate, or at least surround the length of a plurality of mechanical support structures 102 and variable layers 106. That is, instead of packing a grow bin with individual grow media 100 with seams between, a single wicking sleeve 110 may include mechanical support structures 102 with at least one variable layer 106, packed side by side. The top portion of the wicking sleeve 110 may then be sewn to the bottom portion of the wicking sleeve to create seams or crevices similar to the seams 115 shown in FIGS. 15 and 16 by sewing between each of the mechanical support structures 102. The crevices would not extend all the way through but would create a space where the seeds or seedlings could be positioned.

Figure 21:
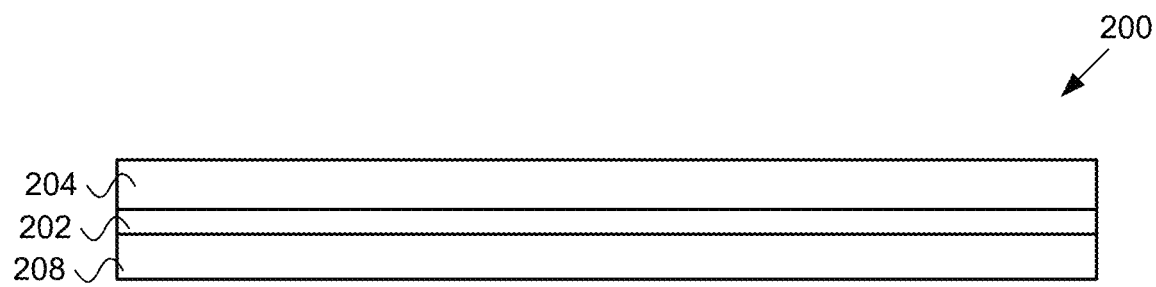
FIG. 21 is a top view of a layered grow media, according to one or more embodiments of the present disclosure.

Referring now to FIG. 21, a top view of a layered grow medium 200 is shown, according to one or more embodiments of the present disclosure. Although the layered grow medium 200 is shown and described with certain components and functionality, other embodiments of the layered grow medium 200 may include fewer or more components to implement less or more functionality. A variety of embodiments are depicted and described herein to illustrate potential variations and are not intended to be limiting.

In the illustrated embodiment, the grow medium 200 includes various layers that provide varying functionality which may or may not be present in other embodiments. In the illustrated embodiment, the grow medium includes a mechanical support structure layer 202, a variable layer 204, and a wicking layer 208. In other embodiments, the grow medium 200 includes only the wicking layer 208 without mechanical support structure layer 202 or the variable layer 204.

The grow medium 200 includes the mechanical support structure 202 in between the variable layer 204 and the wicking layer 208. In other embodiments, the configuration can be ordered differently. With two or three layers, the order may not be important. Some embodiments may include a plurality of variable layers 204, a plurality of wicking layers 208, and/or a plurality of mechanical support structures 202 in a repeating pattern or in an uneven pattern. In an uneven pattern, the grow medium 200 may include more wicking layers 208 than variable layers 204, or vice versa. Not all combinations are explicitly described herein. Depending on the application of the grow medium 200 (e.g., what plant will be growing), the ratio of wicking layers 208 to variable layers 204 may be adjusted to suit the particular plant being grown. In addition, heavier plants may need more mechanical support structure 202 while lighter plants may not need a mechanical support structure 202 at all.

The grow media 200 may positioned side by side in a grow bin like files in a filing cabinet. The seeds and seedlings may then be planted in the seams between the layers. As the roots grow out they push through the wicking layers 208 and the variable layers 204 and are supported by the mechanical support structures 202. In some embodiments, the grow media 200 includes a plurality of layers that are coupled together in a vertical configuration. In some embodiments, the layers can be sewn together or woven together. In some embodiments, the layers are not mechanically coupled together but are positioned together abutting adjacent layers.

Figure 22:
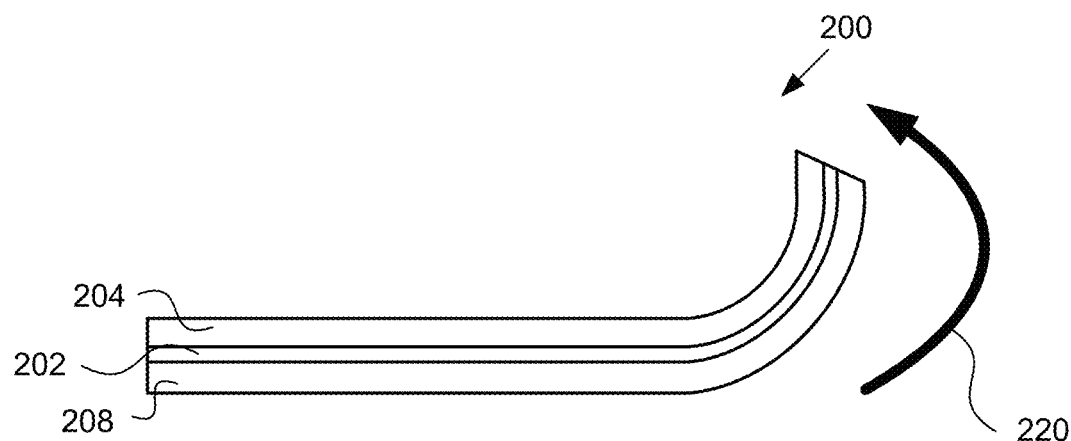
FIG. 22 is a top view of the layered grow media of FIG. 21 being rolled up, according to one or more embodiments of the present disclosure.
Figure 23:
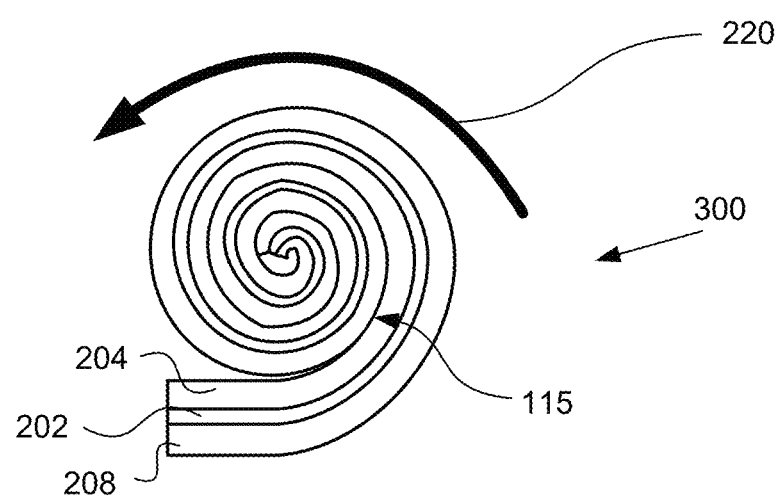
FIG. 23 is a top view of a spirally-layered grow media, according to one or more embodiments of the present disclosure.

Referring now to FIGS. 22 and 23, a top view of a layered grow media being rolled up is shown, according to one or more embodiments of the present disclosure. Any configuration of layers may be utilized but the illustrated embodiments depict a grow medium 200 similar to what is depicted in FIG. 21. The layers may be stacked on top of each other and rolled up as shown (indicated by arrow 220). The rolled-up configuration creates a spirally-layered grow media 300 as shown in FIG. 23. The spirally-layered grow media 300 may then be packed into a circular grow bin (e.g., a bucket) with the layers vertically oriented. The seeds and seedlings then may be planted in the seams between the layers or within the layers themselves, such as within apertures of the wicking layer 208. In some embodiments, the mechanical support structure layer 202, the wicking structure layer 208, and the variable layer 204 are coupled together in a spiral configuration. Other embodiments may include more or less layers as described in conjunction with the other Figures herein. In some embodiments, the mechanical support structure layer 202 may be partially rigid and partially flexible to allow the grow medium 200 to roll up into a square or rectangle configuration (or other shape).

In some embodiments, the mechanical support structure layer 202 is configured to mechanically support a root system for an organic plant. In some embodiments, the mechanical support structure layer 202 includes a lattice structure 304 and a plurality of openings 302 (see, for example, FIG. 24). The openings are rigid and inelastic or relatively inelastic to allow for the structural support of a root system and to allow the root system to branch out into multiple layers and through the grow media 200.

Figure 24:
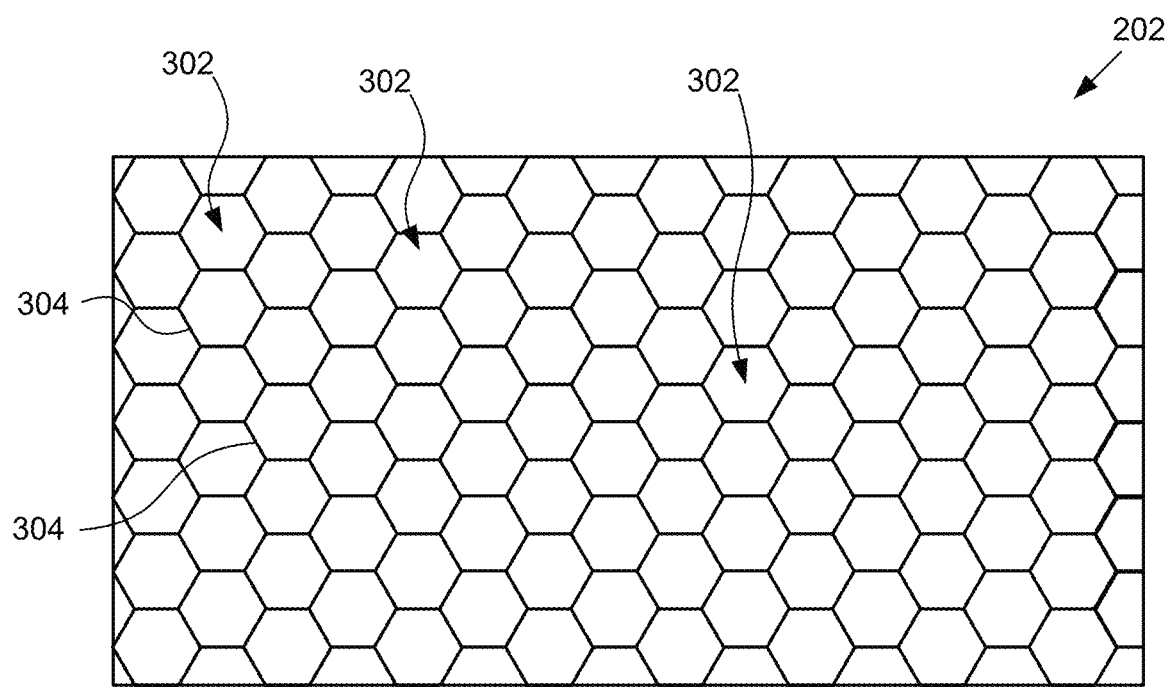
FIG. 24 is a side view of a mechanical support structure, according to one or more embodiments of the present disclosure.

In some embodiments, the openings 302 are similarly shaped and similarly sized and positioned in an ordered array (see, for example, FIG. 24). In other embodiments, the openings 302 are of varying sizes and shapes in a disordered array. In some embodiments, the lattice structure 304 is flexible (e.g., allowing for the mechanical support structure layer 202 to be rolled up) but is inelastic or not stretchable. That is, the openings 302 do not stretch to create a larger opening. In some embodiments, the lattice structure 304 is rigid and inelastic. In other embodiments, the lattice structure 304 is elastic and stretchable.

Referring now to FIG. 24, a side view of a mechanical support structure 202 is shown, according to one or more embodiments of the present disclosure. The mechanical support structure 202 is, in some embodiments, similar to the mechanical support structures 102 described in conjunction with FIGS. 1-20 and may include some or all of the features described therein. In the illustrated embodiments, the mechanical support structure 202 is a lattice structure 304 forming hexagon-shaped openings 302. The mechanical support structure 202 can be manufactured or cut to various lengths and heights to allow for customization of size. That is, the mechanical support structure 202 may be sized to fit a grow bin (both depth and area).

In the illustrated embodiments, the lattice structure 304 forms an ordered array. Other embodiments may utilize different shapes and sizes in a disordered array of openings. The mechanical support structure 202 may be made of plastics, composites, polymers, or other materials that are strong enough to support a root system and otherwise compatible with organic plant root systems.

Figure 25:
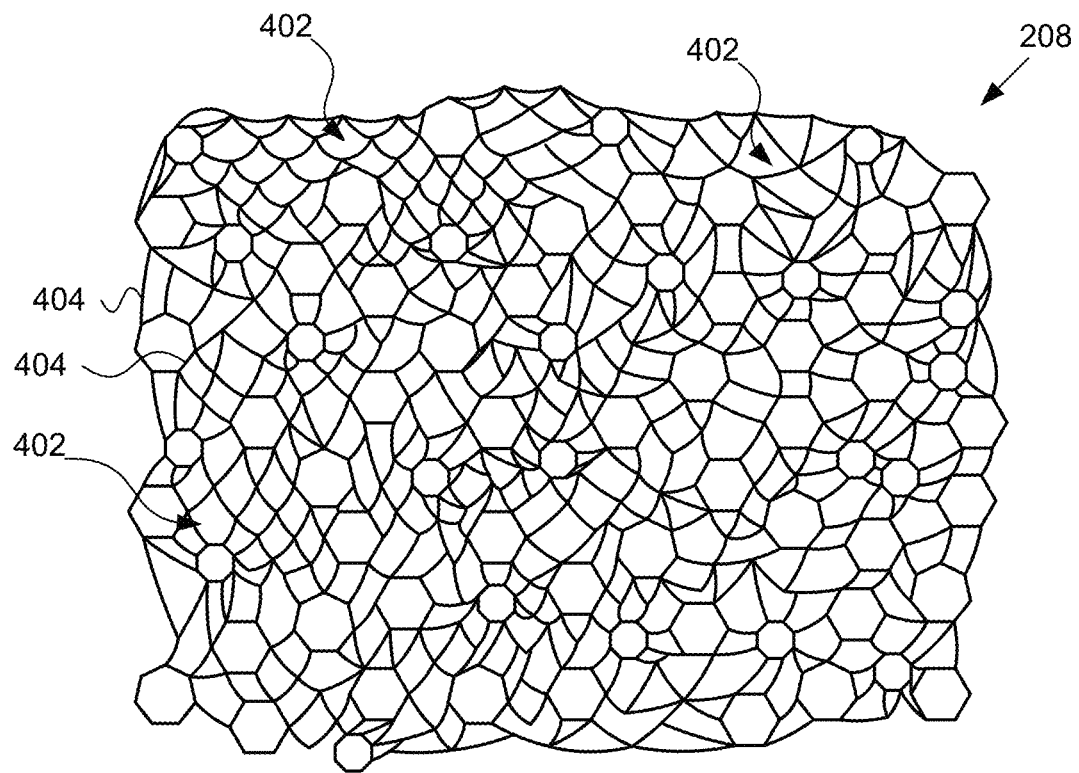
FIG. 25 is a side view of a wicking structure, according to one or more embodiments of the present disclosure.

Referring now to FIG. 25, a side view of a wicking structure layer 208 is shown, according to one or more embodiments of the present disclosure. In some embodiments, the grow medium 200 includes just the wicking structure 208 without any mechanical support structure 202 or variable layer 204. In other embodiments, the grow media 200 includes the wicking structure 208 and the mechanical support structure 202 without any variable layers 204.

Referring again to FIG. 25, in some embodiments, the wicking structure 208 netting or mesh or mesh netting 404 of a wicking material. The wicking material may be made of various thicknesses and sizes. As depicted, the mesh netting 404 of the wicking structure 208 forms a plurality of apertures 402. In some embodiments, the apertures 402 are of various shapes and sizes. The variable sizing apertures 402 allows for the mesh netting 404 to surround various differently sized roots. In addition, as the roots grow in size as the plant matures, the mesh netting 404 is configured to be stretchable and/or elastic. This allows the roots to grow and remain in contact with the mesh netting 404 and allow for wicking water and nutrients within the water or mixed in the water from a water basin to a root system for an organic plant. As an example, the mesh netting 404 may be partially coupled to a water basin with portions of a root system branching out through the apertures 402 of the mesh netting 404.

As described herein, in some embodiments, the grow media 200 may include only the wicking structure 208. As an example, the wicking structure 208 may be bunch in a randomly oriented structure similar to what is shown in FIG. 25. The randomly oriented structure allows for the wicking structure 208 to support root systems with varying size of root. As plants mature and grow larger, it may become necessary to place the wicking structure 208 with a layered grow medium 200 including a mechanical support structure 202 and roll the layers together in a spiral configuration or another configuration contemplated herein. The mesh netting 404 may be elastically stretchable to allow for the apertures 402 to increase in size as the plant grows.

The wicking structure 208 may be made of various wicking materials that are stretchable and can be woven manufactured into variable shaped and variable sized apertures 402. The flexibility allows for many different size plants to utilize a same mesh netting 404.

Figure 26:
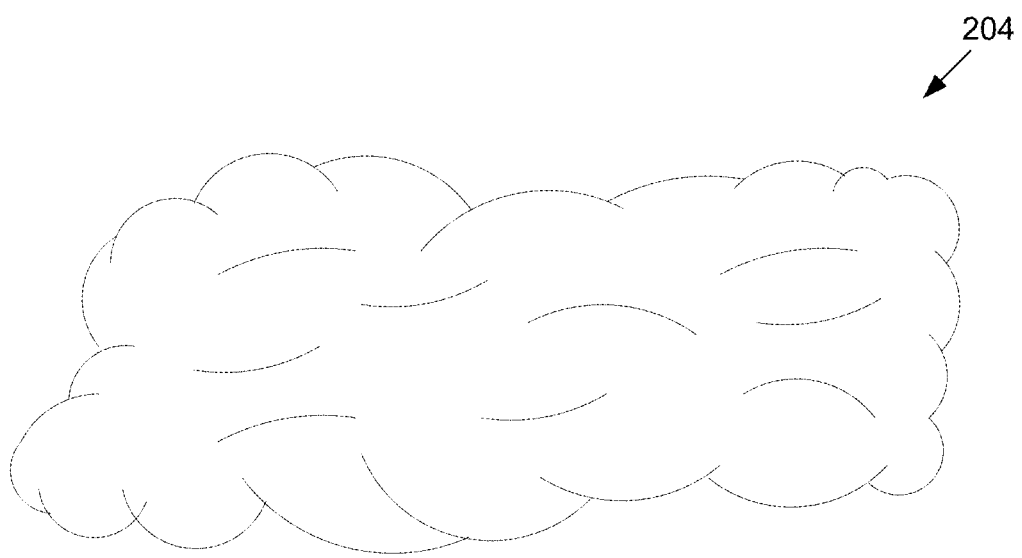
FIG. 26 is a perspective view of a variable layer, according to one or more embodiments of the present disclosure.
Figure 27:
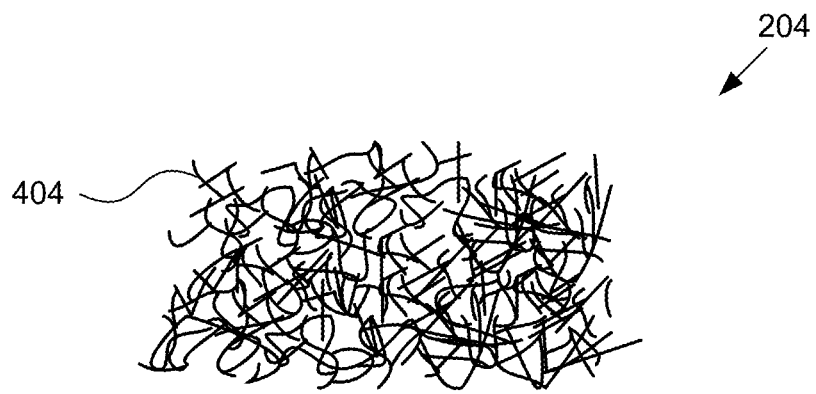
FIG. 27 is a close-up view of the variable layer, according to one or more embodiments of the present disclosure.

Referring now to FIG. 26, a perspective view of a variable layer 204 is shown, according to one or more embodiments of the present disclosure. The variable layer 204 may be made of various materials including polyester, food grade polyester, or a polyethylene, polyester blends, elastic polyurethane fiber blends, spandex blends, elastane blends, rayon blends and other regenerated cellulose fibers, and other similar materials, or combinations thereof, etc. The variable layer 204 may include one or more of random oriented strand batting, an open mesh pad, a chopped recycled fabric, a woven fabric, a knit fabric, or a loose pack variable layer. The variable layer 204 may be a hydrophilic material or, in other embodiments, may be a hydrophobic material. Referring now to FIG. 27, a close-up detail view of the variable layer 204 is shown depicting randomly oriented fibers that make up the variable layer 204, according to one or more embodiments of the present disclosure.

Figure 28:
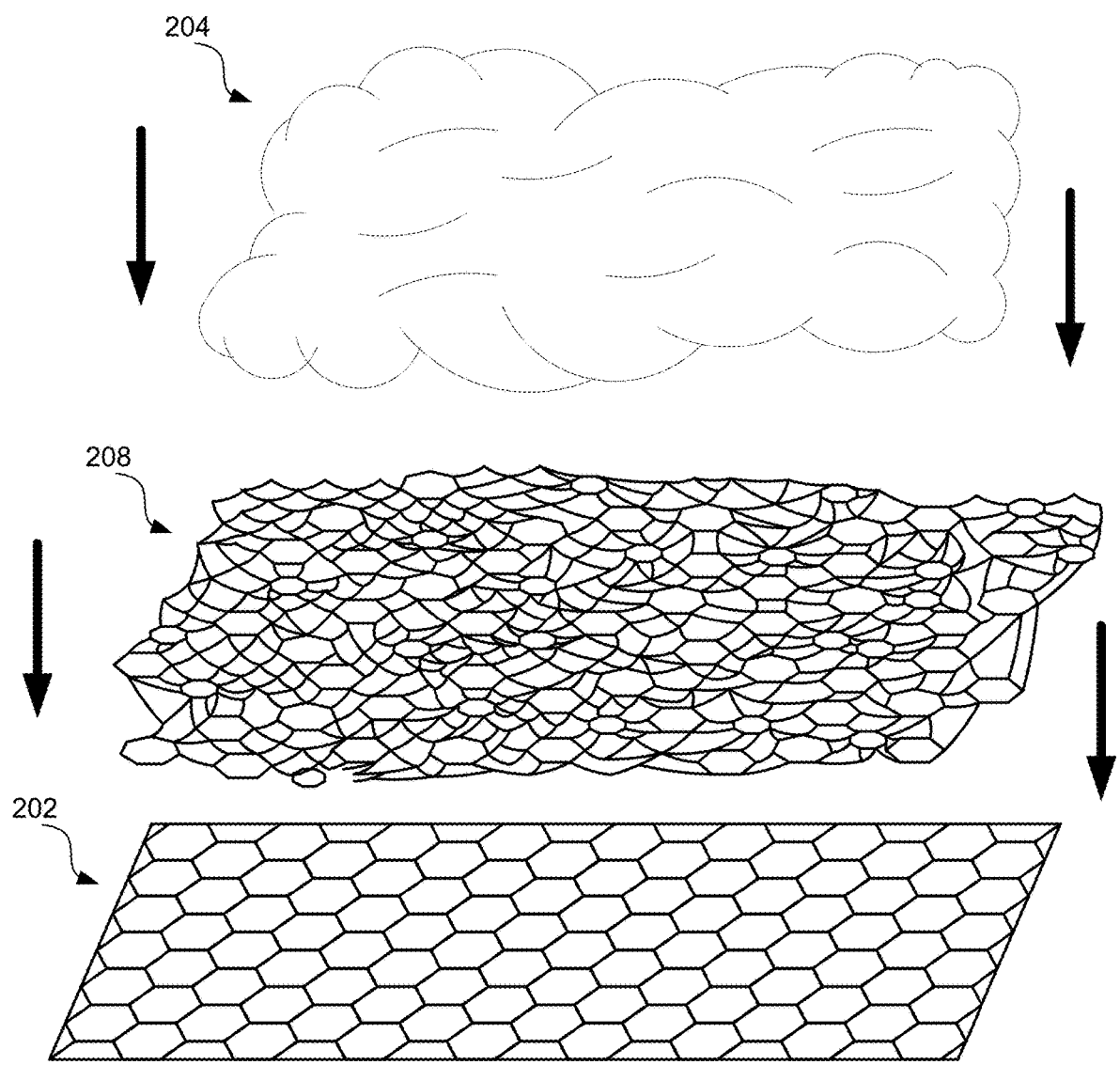
FIG. 28 is a perspective view depicting a stacking of a layered grow media, according to one or more embodiments of the present disclosure.

Referring now to FIG. 28, a perspective view depicting a stacking of various layers of a grow media is shown, according to one or more embodiments of the present disclosure. As shown, the wicking structure 208 is stacked on top of the mechanical support structure 202. The variable layer 204 is also stacked on top of the wicking structure 208. As already discussed variations on which layers are included (or not included) and the order of the layers can be adjusted to meet the demands of the plant to be grown.

Figure 29:
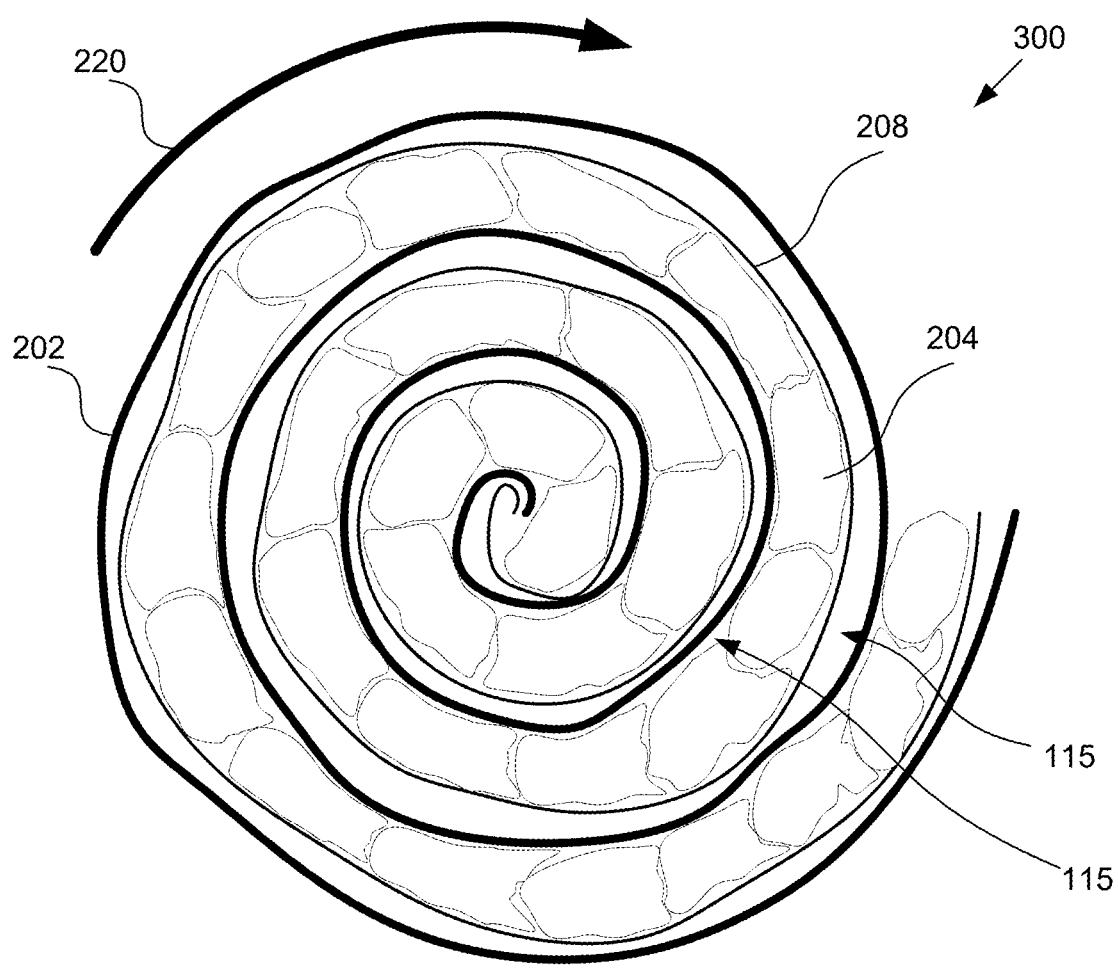
FIG. 29 is a top view of a spirally-layered grow media, according to one or more embodiments of the present disclosure.
Figure 30:
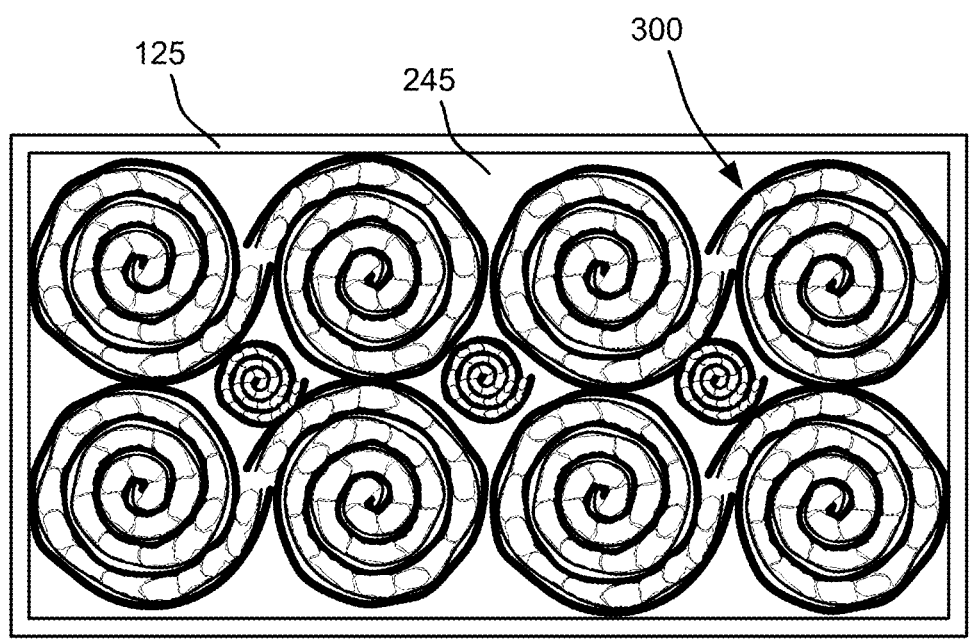
FIG. 30 is a top view of a system including a grow bin and spirally-layered grow media, according to one or more embodiments of the present disclosure.

Referring now to FIG. 29, a top view of a spirally-layered grow media 300 is shown, according to one or more embodiments of the present disclosure. The thickness of various layers may be exaggerated to better illustrate the layers as the grow media is rolled into a spiral configuration. As discussed previously, a single spirally-layered grow media 300 may be utilized or, referring to FIG. 30, a plurality of spirally-layered grow media 300 may be packed into a grow bin 125.

Figure 31:
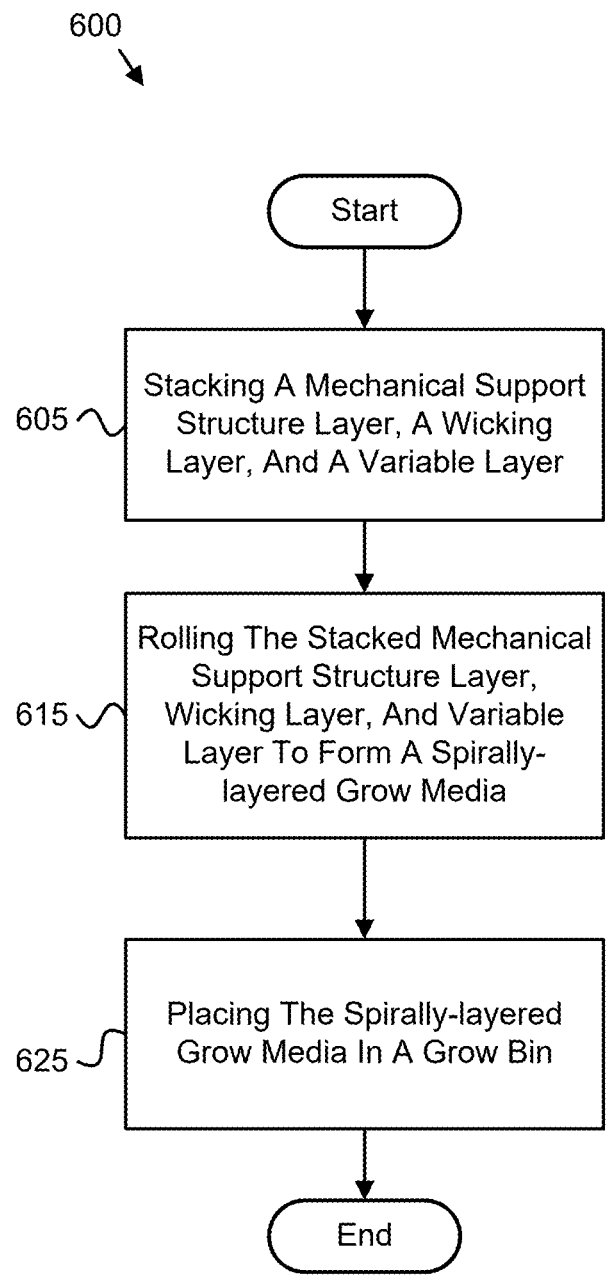
FIG. 31 is a schematic block diagram of a method, according to one or more embodiments of the present disclosure.

Referring now to FIG. 31, a schematic block diagram of a method 600 is shown, according to one or more embodiments of the present disclosure. Although, the method is described in conjunction with the FIGS. above, the method may be accomplished via alternative embodiments. At block 605, a mechanical support structure layer, a wicking structure layer, and a variable layer are stacked. Other embodiments may stack more or less layers, adding or omitting the layers described. At block 615, the stacked layers are rolled to form a spirally-layered grow media. At block 625, the spirally-layered grow media is placed in a grow bin. The method then ends.

In some embodiments, the method may further include growing organic plants between the spiral layers of the spirally-layered grow media. In some embodiments, the mechanical support structure layer, the wicking layer, and the variable layer are not mechanically coupled to each other. In other embodiments, the spirally-layered grow media may include some or all of the features described in conjunction with the other embodiments described in conjunction with FIGS. 1-30 and are not repeated for the sake of brevity.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of"

means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A grow media comprising:
    a layered grow media comprising:
        a mechanical support structure layer; and
        a wicking structure layer comprising a mesh netting forming a plurality of apertures, wherein the mechanical support structure layer and the wicking structure layer are coupled together in a vertical configuration, wherein the mesh netting is elastically stretchable to allow for the apertures to increase in size, and wherein the plurality of apertures vary in size and shape.

2. The grow media according to claim 1, wherein the mechanical support structure layer and the wicking structure layer are coupled together in a spiral configuration and wherein the layered grow media is a spirally-layered grow media.

3. The grow media according to claim 1, wherein the mechanical support structure layer is configured to mechanically support a root system for an organic plant.

4. The grow media according to claim 1, wherein the wicking structure layer is configured to wick water and nutrients within the water or mixed in the water from a water basin to a root system for an organic plant.

5. The grow media according to claim 1, wherein the mechanical support structure layer comprises a lattice structure and a plurality of openings, wherein the plurality of openings are in an ordered array.

6. The grow media according to claim 1, wherein the mechanical support structure layer comprises a lattice structure and a plurality of openings, wherein the lattice structure is flexible but inelastic.

7. The grow media according to claim 1, wherein the layered grow media comprises a plurality of wicking layers and a plurality of variable layers.

8. The grow media according to claim 1, wherein the layered grow media further comprises a variable layer comprising randomly oriented fibers.

9. The grow media according to claim 1, wherein the layered grow media further comprises a variable layer comprising a hydrophobic material.

10. The grow media according to claim 1, wherein the layered grow media further comprises a variable layer comprising a hydrophilic material.

11. The grow media according to claim 1, wherein the layered grow media further comprises a variable layer comprising one of random oriented strand batting, an open mesh pad, a chopped recycled fabric, a woven fabric, a knit fabric, or a loose pack variable layer.

12. The grow media according to claim 1, wherein:
    the layered grow media further comprises a variable layer;
    the mechanical support structure layer, the wicking structure layer, and the variable layer are coupled together in a spiral configuration and wherein the layered grow media is a spirally-layered grow media;
    the mechanical support structure layer is configured to mechanically support a root system for an organic plant and the mechanical support structure layer comprises a repeating lattice structure and a plurality of repeating openings;
    the wicking layer is configured to wick water and nutrients within the water or mixed in the water from a water basin to the root system for the organic plant and the wicking layer comprises a mesh netting forming a plurality of apertures;
    the plurality of apertures vary in size and shape;
    the mesh netting is elastically stretchable to allow for the apertures to increase in size;
    the variable layer comprises randomly oriented fibers; and
    the spirally-layered grow media comprises a plurality of wicking layers and a plurality of variable layers.

13. A system comprising:
    a layered grow media comprising:
        a mechanical support structure layer;
        a wicking structure layer, wherein the wicking structure layer is configured to wick water and nutrients within the water or mixed in the water from a water basin to a root system for an organic plant, wherein the wicking structure layer comprises a mesh netting forming a plurality of apertures, wherein the mesh netting is elastically stretchable to allow for the apertures to increase in size; and wherein the mechanical support structure layer and the wicking structure layer are coupled together in a vertical configuration; and a grow bin to house the layered grow media.

14. The system according to claim 13, further comprising soil or an aggregate medium and a water basin.

* * * * *